US011275964B2

(12) United States Patent
Barish

(10) Patent No.: US 11,275,964 B2
(45) Date of Patent: Mar. 15, 2022

(54) METHODS FOR DETERMINING UNIT LOAD DEVICE (ULD) CONTAINER TYPE USING TEMPLATE MATCHING

(71) Applicant: ZEBRA TECHNOLOGIES CORPORATION, Lincolnshire, IL (US)

(72) Inventor: Justin F. Barish, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 162 days.

(21) Appl. No.: 16/832,775

(22) Filed: Mar. 27, 2020

(65) Prior Publication Data

US 2021/0303904 A1   Sep. 30, 2021

(51) Int. Cl.
*G06K 9/46* (2006.01)
*G06K 9/62* (2022.01)
(Continued)

(52) U.S. Cl.
CPC ......... *G06K 9/4609* (2013.01); *G06K 9/6202* (2013.01); *G06Q 10/087* (2013.01); *G06T 7/337* (2017.01); *G06T 7/74* (2017.01)

(58) Field of Classification Search
CPC . G06T 2207/10028; G06T 2207/30268; G06T 2200/04; G06T 7/0008; G06T 7/62; G06T 7/0004; G06T 7/11; G06T 7/246; G06T 7/254; G06T 7/50; G06T 7/593; G06T 7/60; G06T 2207/10012; G06T 2207/30108; G06T 2207/30112; G06T 2207/30232; G06T 7/12; G06K 9/00201; G06K 9/00771; G06K 2009/00738; G06K 2009/19; G06K 9/00624; G06K 9/00718; G06K 9/00979; G06K 9/34; G06K 9/4642; G06K 9/6211; G06K 9/6212; G06K 9/6256; G06K 9/6272; G06K 9/78; H04N 13/271;
(Continued)

(56) References Cited

U.S. PATENT DOCUMENTS 10,118,576 B2 * 11/2018 Breed ................. G01F 23/20
10,820,307 B2 * 10/2020 Zhang ............. H04W 72/1284
(Continued)

FOREIGN PATENT DOCUMENTS

CN         113392747 A  *  9/2021
WO   WO-2020124247 A1  *  6/2020 ........... G06N 3/0445

*Primary Examiner* — Ian L Lemieux
(74) *Attorney, Agent, or Firm* — Yuri Astvatsaturov

(57) ABSTRACT

Methods for determining a unit load device (ULD) container type are disclosed herein. An example method includes capturing a set of image data featuring the ULD and aligning the set of image data with a template. The method further includes converting the set of image data and the template to down-sampled grids including a plurality of rows and columns. The method further includes removing portions of the image data grid that do not exceed a density threshold. The method further includes identifying a ULD border and a template border by extracting leftmost, rightmost, and topmost grid values from the respective grids. The method further includes calculating a match score corresponding to the template by determining a shortest respective distance between grid values in the ULD border and the template border, and determining ULD container type corresponding to the ULD based on the match score.

18 Claims, 7 Drawing Sheets

(51) Int. Cl.
*G06Q 10/08* (2012.01)
*G06T 7/33* (2017.01)
*G06T 7/73* (2017.01)

(58) Field of Classification Search
CPC .... H04N 13/204; H04N 13/243; B65D 90/48;
G01B 11/002; G06Q 10/06393; G06Q
10/08; G06Q 10/28
See application file for complete search history.

(56) References Cited

U.S. PATENT DOCUMENTS

| | | | |
|---|---|---|---|
| 10,991,116 B1* | 4/2021 | Barish | G06T 7/001 |
| 11,010,915 B2* | 5/2021 | Wang | G06T 7/70 |
| 2021/0256682 A1* | 8/2021 | Barish | G06T 15/00 |
| 2021/0312216 A1* | 10/2021 | De Gouveia | G06Q 50/28 |

* cited by examiner

METHODS FOR DETERMINING UNIT LOAD DEVICE (ULD) CONTAINER TYPE USING TEMPLATE MATCHING

BACKGROUND

In commercial shipping via airplanes, packages are loaded into containers called unit load devices (ULDs). Many different types of ULDs exist, of which about 20 are commonly used. This poses challenges for high-fidelity container analytics, because any algorithm must be generic enough to work with any ULD, but specific enough to provide accurate metrics for each specific container. In any event, to provide accurate metrics, the algorithms must know the ULD container type. Correspondingly, a major point of emphasis in the transportation/shipping industry is performing high fidelity ULD container type determinations at the load point of such containers.

At present, loaders manually scan a barcode on the side of the ULD and enter or scan a load point id associated with a specific load monitoring unit (LMU). The ULD barcode scan is sent to a backend server, and then to the LMU, which extracts the ULD container type and uses it in its calculations. Unfortunately, loaders often forget to scan the container, or enter the wrong load point, rendering the calculated analytics useless.

Thus, there is a need for imaging systems and methods for ULD container type determination that allow for fast, efficient, and accurate real-time ULD container type assessments for ULD load point analytics.

SUMMARY

In an embodiment, the present invention is a method for determining a unit load device (ULD) container type. The method includes capturing a set of image data featuring the ULD; aligning the set of image data with a template; converting (i) the set of image data to a first down-sampled grid including a plurality of rows and a plurality of columns and (ii) the template to a second down-sampled grid including the plurality of rows and the plurality of columns; removing any portions of the first down-sampled grid that do not exceed a density threshold; identifying a ULD border by extracting (i) a first leftmost grid value and a first rightmost grid value from each row of the plurality of rows and (ii) a first topmost grid value from each column of the plurality of columns; identifying a template border by extracting (i) a second leftmost grid value and a second rightmost grid value from each row of the plurality of rows and (ii) a second topmost grid value from each column of the plurality of columns; calculating a match score corresponding to the template by determining a shortest respective distance between each grid value in the ULD border and a respective grid value in the template border; and determining a ULD container type corresponding to the ULD based on the match score.

In a variation of this embodiment, the template is a set of templates, the template border is a set of template borders, and the method further comprises calculating a respective match score corresponding to each respective template by determining a shortest respective distance between each grid value in the ULD border and a respective grid value in a respective template border; determining a closest respective match score by comparing each respective match score to every other respective match score; and determining the ULD container type by associating the ULD with the respective template associated with the closest respective match score.

In another variation of this embodiment, the method further comprises dividing the first down-sampled grid into a left half and a right half; identifying a first ULD border by extracting (i) a left half leftmost grid value and a left half rightmost grid value for each row of the plurality of rows and (ii) a left half topmost grid value for each column of the plurality of columns in the left half; identifying a second ULD border by extracting (i) a right half leftmost grid value and a right half rightmost grid value for each row of the plurality of rows and (ii) a right half topmost grid value for each column of the plurality of columns in the right half; calculating (i) a left match score corresponding to the template by determining a shortest respective distance between each left half grid value in the first ULD border and a respective grid value in the template border and (ii) a right match score corresponding to the template by determining a shortest respective distance between each right half grid value in the second ULD border and a respective grid value in the template border; and determining a ULD container type corresponding to the ULD based on the sum of the left match score and the right match score.

In yet another variation of this embodiment, the method further comprises overlaying a grid on the set of image data and the template, the grid including a plurality of cells defined by the plurality of rows and the plurality of columns, wherein each row in the plurality of rows is separated from adjacent rows in the plurality of rows by a predetermined row distance, and wherein each column in the plurality of columns is separated from adjacent columns in the plurality of columns by a predetermined column distance; and determining a plurality of grid values by binning respective data from the set of image data that is included in each respective cell of the plurality of cells and comparing the respective data to a down-sampling threshold.

In still another variation of this embodiment, the method further comprises determining the shortest respective distance between each grid value in the ULD border and a respective grid value in the template border using a k-dimensional (k-d) tree search algorithm. In another variation of this embodiment, the method further comprises removing the portions of the first down-sampled grid that do not exceed a density threshold by applying a depth-first search (DFS) algorithm.

In another embodiment, the present invention is a system for determining a unit load device (ULD) container type. The system includes a housing, an imaging assembly at least partially within the housing and configured to capture a set of image data featuring the ULD, one or more processors, and a non-transitory computer-readable memory coupled to the imaging assembly and the one or more processors. The memory stores instructions thereon that, when executed by the one or more processors cause the one or more processors to align the set of image data with a template; convert (i) the set of image data to a first down-sampled grid including a plurality of rows and a plurality of columns and (ii) the template to a second down-sampled grid including the plurality of rows and the plurality of columns; remove any portions of the first down-sampled grid that do not exceed a density threshold; identify a ULD border by extracting (i) a first leftmost grid value and a first rightmost grid value from each row of the plurality of rows and (ii) a first topmost grid value from each column of the plurality of columns; identify a template border by extracting (i) a second leftmost grid value and a second rightmost grid value from each row of the plurality of rows and (ii) a second topmost grid value from each column of the plurality of columns; calculate a match score corresponding to the template by determining a shortest respective distance between each grid value in the ULD border and a respective grid value in the template border; and determine a ULD container type corresponding to the ULD based on the match score.

In a variation of this embodiment, the template is a set of templates, the template border is a set of template borders, and the instructions, when executed, further cause the one or more processors to calculate a respective match score corresponding to each respective template by determining a shortest respective distance between each grid value in the ULD border and a respective grid value in a respective template border; determine a closest respective match score by comparing each respective match score to every other respective match score; and determine the ULD container type by associating the ULD with the respective template associated with the closest respective match score.

In another variation of this embodiment, the instructions, when executed, further cause the one or more processors to divide the first down-sampled grid into a left half and a right half; identify a first ULD border by extracting (i) a left half leftmost grid value and a left half rightmost grid value for each row of the plurality of rows and (ii) a left half topmost grid value for each column of the plurality of columns in the left half; identify a second ULD border by extracting (i) a right half leftmost grid value and a right half rightmost grid value for each row of the plurality of rows and (ii) a right half topmost grid value for each column of the plurality of columns in the right half; calculate (i) a left match score corresponding to the template by determining a shortest respective distance between each left half grid value in the first ULD border and a respective grid value in the template border and (ii) a right match score corresponding to the template by determining a shortest respective distance between each right half grid value in the second ULD border and a respective grid value in the template border; and determine a ULD container type corresponding to the ULD based on the sum of the left match score and the right match score.

In yet another variation of this embodiment, the instructions, when executed, further cause the one or more processors to overlay a grid on the set of image data and the template, the grid including a plurality of cells defined by the plurality of rows and the plurality of columns, wherein each row in the plurality of rows is separated from adjacent rows in the plurality of rows by a predetermined row distance, and wherein each column in the plurality of columns is separated from adjacent columns in the plurality of columns by a predetermined column distance; and determine a plurality of grid values by binning respective data from the set of image data that is included in each respective cell of the plurality of cells and comparing the respective data to a down-sampling threshold.

In still another variation of this embodiment, the instructions, when executed, further cause the one or more processors to determine the shortest respective distance between each grid value in the ULD border and a respective grid value in the template border using a k-dimensional (k-d) tree search algorithm. In another variation of this embodiment, the instructions, when executed, further cause the one or more processors to remove the portions of the first down-sampled grid that do not exceed a density threshold by applying a depth-first search (DFS) algorithm.

In yet another embodiment, the present invention is a tangible machine-readable medium comprising instructions for determining a unit load devices (ULD) container type. When executed, the instructions cause a machine to at least capture a set of image data featuring the ULD; align the set of image data with a template; convert (i) the set of image data to a first down-sampled grid including a plurality of rows and a plurality of columns and (ii) the template to a second down-sampled grid including the plurality of rows and the plurality of columns; remove any portions of the first down-sampled grid that do not exceed a density threshold; identify a ULD border by extracting (i) a first leftmost grid value and a first rightmost grid value from each row of the plurality of rows and (ii) a first topmost grid value from each column of the plurality of columns; identify a template border by extracting (i) a second leftmost grid value and a second rightmost grid value from each row of the plurality of rows and (ii) a second topmost grid value from each column of the plurality of columns; calculate a match score corresponding to the template by determining a shortest respective distance between each grid value in the ULD border and a respective grid value in the template border; and determine a ULD container type corresponding to the ULD based on the match score.

In a variation of this embodiment, the template is a set of templates, the template border is a set of template borders, and wherein the instructions, when executed, further cause the machine to at least calculate a respective match score corresponding to each respective template by determining a shortest respective distance between each grid value in the ULD border and a respective grid value in a respective template border; determine a closest respective match score by comparing each respective match score to every other respective match score; and determine the ULD container type by associating the ULD with the respective template associated with the closest respective match score.

In another variation of this embodiment, the instructions, when executed, further cause the machine to at least divide the first down-sampled grid into a left half and a right half; identify a first ULD border by extracting (i) a left half leftmost grid value and a left half rightmost grid value for each row of the plurality of rows and (ii) a left half topmost grid value for each column of the plurality of columns in the left half; identify a second ULD border by extracting (i) a right half leftmost grid value and a right half rightmost grid value for each row of the plurality of rows and (ii) a right half topmost grid value for each column of the plurality of columns in the right half; calculate (i) a left match score corresponding to the template by determining a shortest respective distance between each left half grid value in the first ULD border and a respective grid value in the template border and (ii) a right match score corresponding to the template by determining a shortest respective distance between each right half grid value in the second ULD border and a respective grid value in the template border; and determine a ULD container type corresponding to the ULD based on the sum of the left match score and the right match score.

In yet another variation of this embodiment, the instructions, when executed, further cause the machine to at least overlay a grid on the set of image data and the template, the grid including a plurality of cells defined by the plurality of rows and the plurality of columns, wherein each row in the plurality of rows is separated from adjacent rows in the plurality of rows by a predetermined row distance, and wherein each column in the plurality of columns is separated from adjacent columns in the plurality of columns by a predetermined column distance; and determine a plurality of grid values by binning respective data from the set of image data that is included in each respective cell of the plurality of cells and comparing the respective data to a down-sampling threshold.

In still another variation of this embodiment, the instructions, when executed, further cause the machine to at least determine the shortest respective distance between each grid value in the ULD border and a respective grid value in the template border using a k-dimensional (k-d) tree search algorithm. In another variation of this embodiment, the instructions, when executed, further cause the machine to at least remove the portions of the first down-sampled grid that do not exceed a density threshold by applying a depth-first search (DFS) algorithm.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
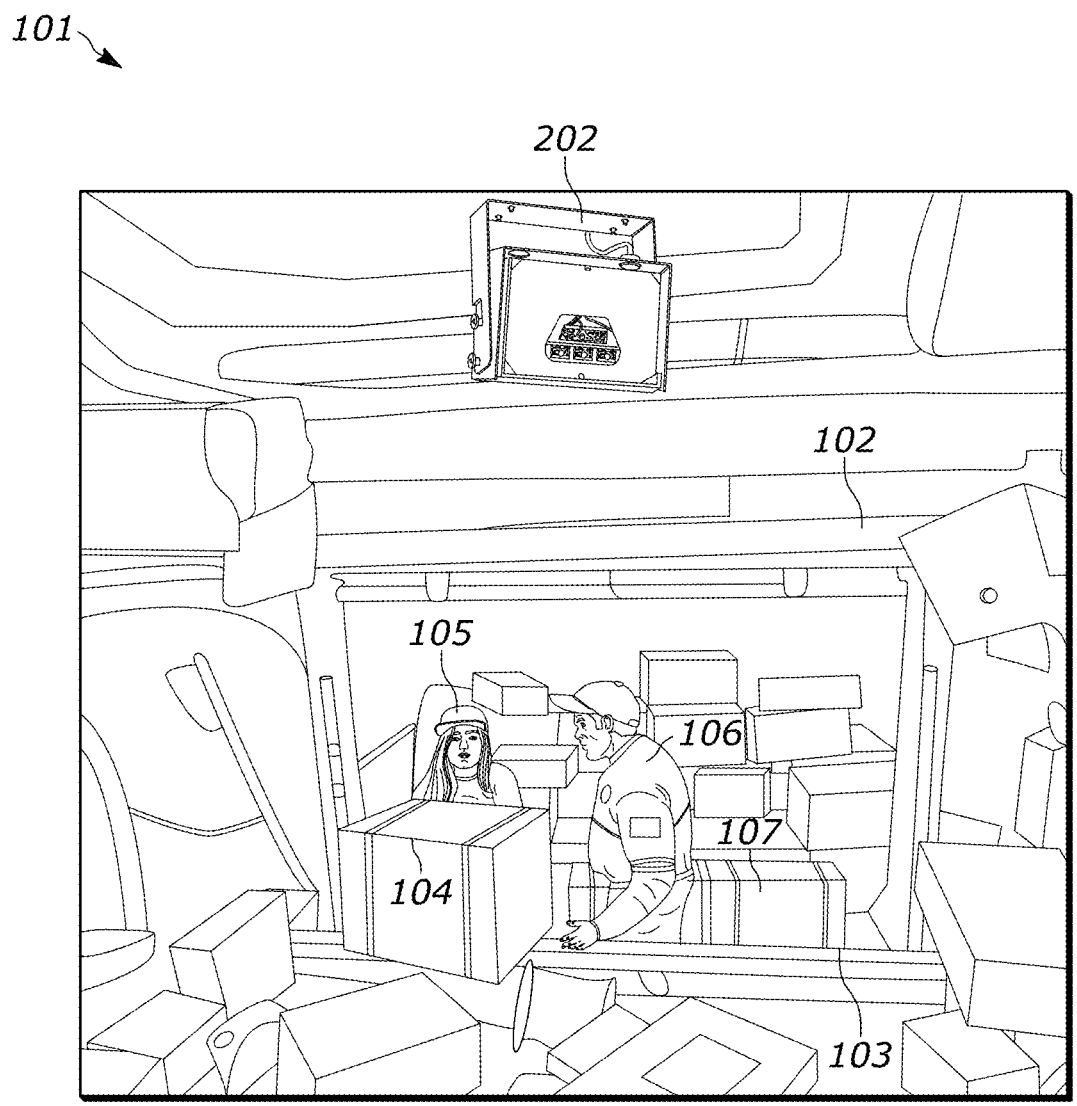
FIG. 1A is a perspective view, as seen from above, of a load point featuring a load monitoring unit (LMU) within a loading facility, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, shipping companies seek to accurately and efficiently detail the load status of each container for which they are responsible. Many companies incorporate imaging systems to provide this analysis (e.g., LMUs). However, these traditional imaging systems suffer from a number of drawbacks, such as being unable to effectively determine ULD container types for ULDs placed within the system's field of view (FOV). For example, machine learning methods to determine ULD container types may require a large amount of data to train, and as a result, many weeks of data may be wasted or otherwise erratic because the model is improperly/insufficiently trained.

Consequently, the methods/systems of the present disclosure provide solutions to the ULD container type determination problems associated with the traditional systems. Namely, the present disclosure provides a way to automatically determine a ULD container type using template matching. A template may be defined as a CAD model of the ULD, converted to a 3D point cloud. An example method of the present disclosure includes capturing a set of image data featuring a ULD. The method may align the set of image data with a template and convert the set of image data and the template to down-sampled grids including a plurality of rows and columns. The method may further include removing portions of the image data grid that do not exceed a density threshold and identifying a ULD border and a template border by extracting leftmost, rightmost, and topmost grid values from the respective grids. The method may further include calculating a match score corresponding to the template by determining a shortest respective distance between grid values in the ULD border and the template border, and determining ULD container type corresponding to the ULD based on the match score.

As used herein, the term "container" shall refer to any container transportable by at least one of a vehicle, a train, a marine vessel, and airplane, and configured to store transportable goods such as boxed and/or unboxed items and/or other types of freight. Accordingly, an example of a container includes an enclosed container fixedly attached to a platform with wheels and a hitch for towing by a powered vehicle. An example of a container also includes an enclosed container removably attached to a platform with wheels and a hitch for towing by a powered vehicle. An example of a container also includes an enclosure that is fixedly attached to a frame of a powered vehicle, such as the case may be with a delivery truck, box truck, etc. As such, while the exemplary embodiment(s) described below may appear to reference one kind of a container, the scope of the invention shall extend to other kinds of container, as defined above.

FIG. 1A is a perspective view, as seen from above, of a load point 101 within a loading facility that depicts a LMU 202 having a 3D camera (e.g., a 3D-depth camera) oriented in a direction to capture 3D image data of a shipping container, in accordance with example embodiments herein. As depicted, shipping container 102 has a shipping container type of "AMJ." Generally, a shipping container is selected from one of several differently dimensioned containers. In various embodiments, shipping containers may comprise any type of ULD. For example, a shipping container type may be of any ULD type, including, for example, any of an AMJ type, an AAD type, an AKE type, an AYY type, a SAA type, and APE type, an AAX type, or an AQF type. For ULD shipping containers, the first letter (e.g., "A" for "Certified aircraft container") indicates a specific type of ULD container, such as certified, thermal, etc., the second letter represents base size in terms of dimensions (e.g., "M" for 96×125 inch), and the third letter represents a side contour size and shape (e.g., "J" for a cube shaped ULD container having a diagonal sloping roof portion on one side only). More generally, however, a shipping container may be any aircraft-based shipping container.

The load point 101 may be a predefined search space determined based on the shipping container size, dimensions, or otherwise configuration and/or the area in which the shipping area is localized. For example, in one embodiment, the predefined search space may be determined based on ULD type, shape, or position within a general area. As shown in FIG. 1A, for example, the predefined search space is determined based on the size and dimensions of the shipping container 102 which is of type AMJ. In general, load point 101 is defined so as to completely (or at least partially) include or image the shipping container. The load point 101 may further include a frontal area 103 that generally defines a front position of the predefined search space and/or shipping container 102.

FIG. 1A additionally depicts, within load point 101, personnel or loaders 105 and 106 that load packages 104 and 107 into the shipping container 102. In the embodiment of FIG. 1A, shipping container 102 is being loaded by loaders 105 with packages 104 and 107 during a loading session. The loading session includes loading a set or group of identified packages into shipping container 102. The loaders 105 and 106 and packages 104 and 107, by movement through the load point 101, may generally cause occlusion and interference with the LMU 202 (as discussed for FIG. 2) capturing 3D image data, over time, of shipping container 102. Thus, accurately determining the ULD container type within the load point 101 is critical to ensure that an improper ULD container type determination does not further complicate the imaging difficulties posed by occlusion and interference during normal operations of a loading session.

Figure 1B:
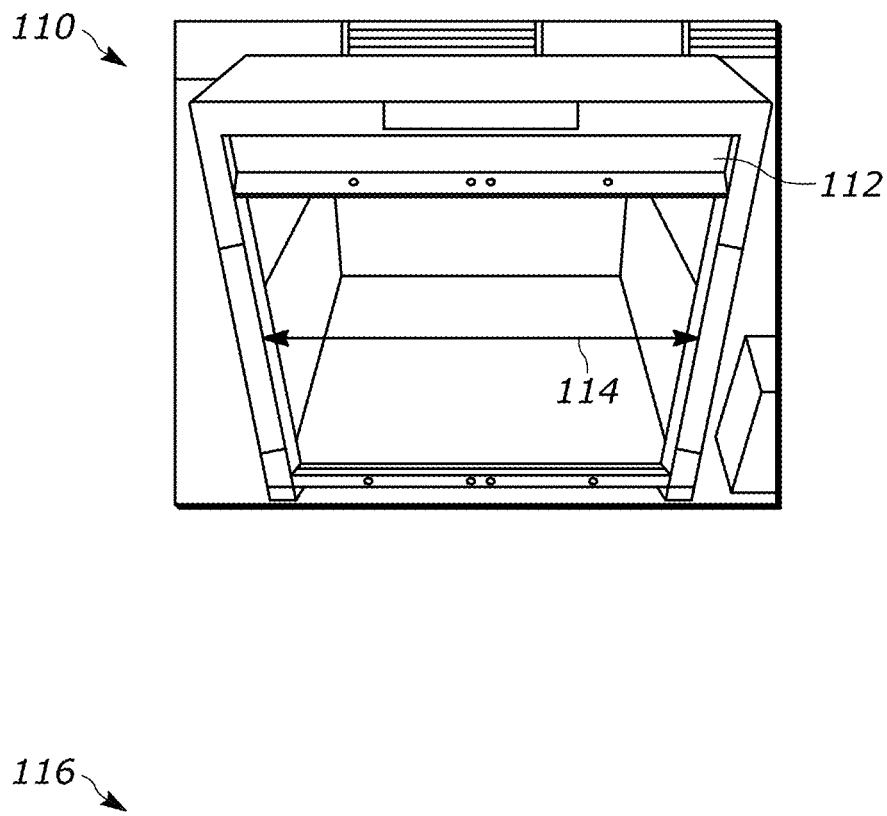
FIG. 1B is a set of example images, as seen from a point of view (POV) of the LMU, of a full scale ULD and split scale ULDs within the loading facility of FIG. 1A, in accordance with embodiments described herein.
Figure 1B:
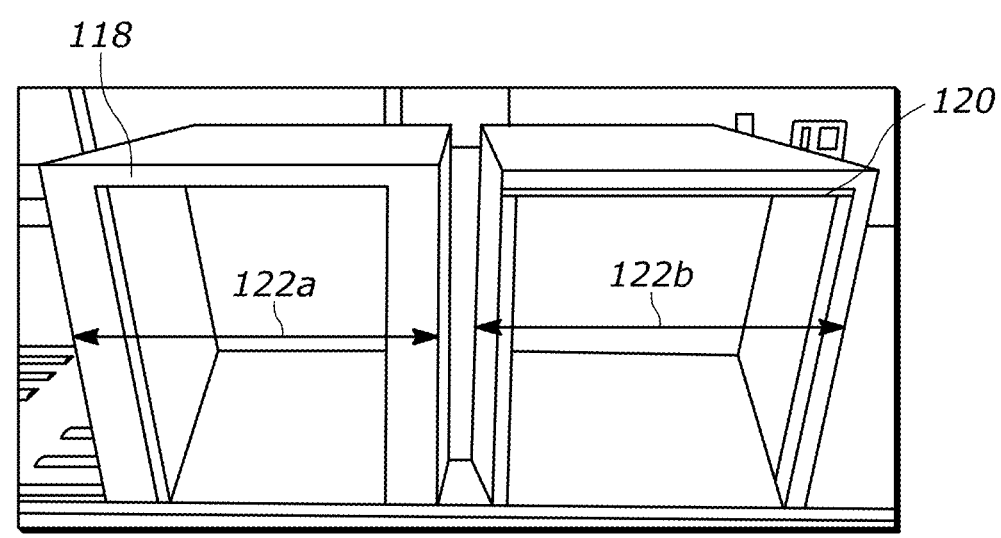

FIG. 1B is a set of example images, as seen from a point of view (POV) of the LMU, of a full scale ULD and split scale ULDs within the loading facility of FIG. 1A, in accordance with embodiments described herein. As previously mentioned, and as illustrated in FIG. 1A, the LMU may be located at an elevated position within a loading point (e.g., load point 101) and oriented in a downward facing direction (e.g., toward the loading point floor). As a result, the LMU image sensor FOV may feature portions of, and the image sensors may capture images of, the top and front sides of a ULD. However, it is to be appreciated that the LMU may be positioned/oriented in any suitable manner to capture images of a front side, a top side, a back side, a bottom side, and/or any other side/surface of a ULD. In any event, these top and front side images allow the LMU to perform loading analytics (e.g., fullness analysis, etc.) with regard to the imaged ULD by determining a UDL container type and examining the interior contents of the imaged ULD.

For example, the LMU may capture a first image 110 of an AAD type ULD 112. The AAD type ULD may have a full scale width 114 that may be commensurate with a standard full scale ULD width. The LMU may also capture a second image 116 of two AKE type ULDs 118, 120. The two AKE type ULDs 118, 120 may each have a respective width 112a, 122b that may be commensurate with a standard half scale ULD width. Hence, the respective widths 122a, 122b of the AKE type ULDS 118, 120 may be half the dimension of the full scale width 114. It is to be appreciated that the dimension of the ULDs may be represented in feet, inches, meters, and/or any other suitable units, or combinations thereof.

In scenarios similar to the second image 116, the LMU must be able to determine a container type for both featured ULDs. To further complicate matters, unlike the scenario represented in the second image 116, the LMU may capture a third image featuring two unique half-scale ULDs. For example, the third image may feature a first ULD of the AKE type (e.g., ULDs 118, 120) and a second ULD a different half scale type. Conventional systems struggle to determine multiple/different ULD container types in a single image, so the systems and methods of the present disclosure improve on those conventional systems by enabling quick and efficient ULD container type determinations for full scale and half scale ULDs.

Figure 2:
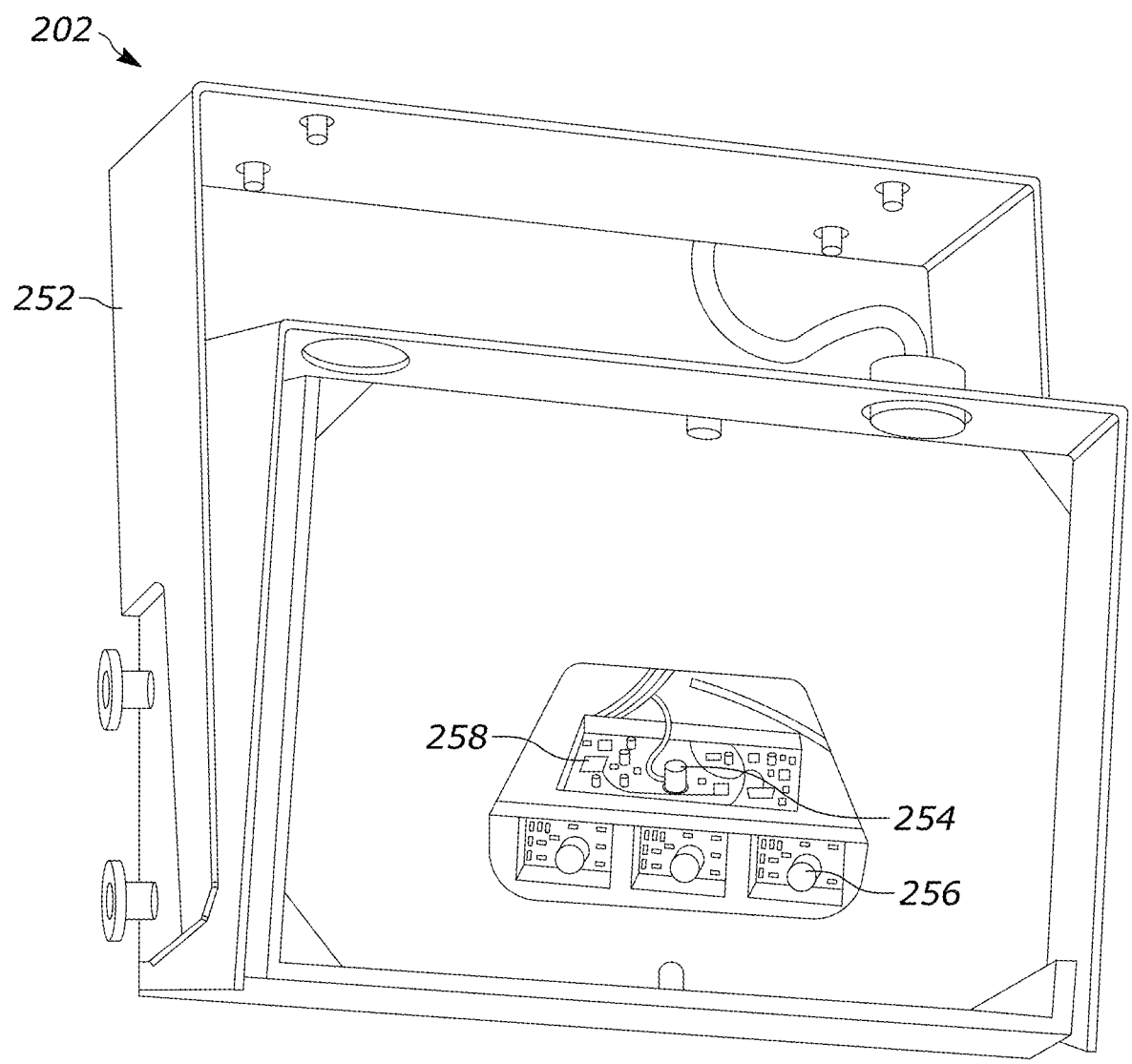
FIG. 2 is a perspective view of the LMU of FIGS. 1A and 1B, in accordance with embodiments described herein.

FIG. 2 is a perspective view of the LMU 202 of FIG. 1A, in accordance with example embodiments herein. In various embodiments, LMU 202 is a mountable device. Generally, an LMU 202 comprises camera(s) and a processing board and is configured to capture data of a loading scene (e.g., a scene including space 101). LMU 202 may run container fullness estimation and other advanced analytical algorithms.

LMU 202 may include a mounting bracket 252 for orienting or otherwise positioning the LMU 202 within a loading facility associated with the load point 101, as described herein. The LMU 202 may further include one or more processors and one or more memories for processing image data as described herein. For example, the LMU 202 may include flash memory used for determining, storing, or otherwise processing the imaging data/datasets and/or post-scanning data. In addition, LMU 202 may further include a network interface to enable communication with other devices.

LMU 202 may include a 3D camera 254 (also referenced herein as a "Time-of-Flight (To F) camera") for capturing, sensing, or scanning 3D image data/datasets. For example, in some embodiments, the 3D camera 254 may include an Infra-Red (IR) projector and a related IR camera. In such embodiments, the IR projector projects a pattern of IR light or beams onto an object or surface, which, in various embodiments herein, may include surfaces or areas of a predefined search space (e.g., load point 101) or objects within the predefined search area, such as boxes or packages (e.g., packages 104 and 107) and storage container 102. The IR light or beams may be distributed on the object or surface in a pattern of dots or points by the IR projector, which may be sensed or scanned by the IR camera. A depth-detection app, such as a depth-detection app executing on the one or more processors or memories of LMU 202, can determine, based on the pattern of dots or points, various depth values, for example, depth values of the predefined search area. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection app and/or LMU 202 to generate a depth map. The depth map may represent a 3D image of, or contain 3D image data of, the objects or surfaces that were sensed or scanned by the 3D camera 254, for example, the load point 101 and any objects, areas, or surfaces therein. The 3D camera 254 may also be configured to capture other sets of image data in addition to the 3D image data, such as grayscale image data or amplitude image data, each of which may be depth-aligned with the 3D image data.

LMU 202 may further include a photo-realistic camera 256 for capturing, sensing, or scanning 2D image data. The photo-realistic camera 256 may be an RGB (red, green, blue) based camera for capturing 2D images having RGB-based pixel data. In some embodiments, the photo-realistic camera 256 may capture 2D images, and related 2D image data, at the same or similar point in time as the 3D camera 254 such that the LMU 202 can have both sets of 3D image data and 2D image data available for a particular surface, object, area, or scene at the same or similar instance in time. In embodiments, the 3D camera 254 and the photo-realistic camera 256 may be a single imaging apparatus configured to capture 3D depth image data simultaneously with 2D image data. Consequently, the captured 2D images and the corresponding 2D image data may be depth-aligned with the 3D images and 3D image data.

LMU 202 may also include a processing board 258 configured to, for example, perform container fullness estimation and other advanced analytical algorithms based on images captured by the cameras 254, 256. Generally, the processing board 258 may include one or more processors and one or more computer memories for storing image data, and/or for executing apps that perform analytics or other functions as described herein. The processing board 258 may also include transceivers and/or other components configured to communicate with external devices/servers. The processing board 258 may thus transmit and/or receive data or other signals to/from external devices/servers before, during, and/or after performing the analytical algorithms described herein.

In various embodiments, and as shown in FIG. 1A, the LMU 202 may be mounted within a loading facility and oriented in the direction of space 101 to capture 3D and/or 2D image data of shipping container 102. For example, as shown in FIGS. 1A and 1B, the LMU 202 may be oriented such that the 3D and 2D cameras of LMU 202 may capture 3D image data of shipping container 102, e.g., where LMU 202 may scan or sense the walls, floor, ceiling, packages, or other objects or surfaces within the space 101 to determine the 3D and 2D image data. The image data may be processed by the processing board 258 of the LMU 202 (or, in some embodiments, one or more remote processors and/or memories of a server) to implement analysis, functions, such as graphical or imaging analytics, as described by the one or more various flowcharts, block diagrams, methods, functions, or various embodiments herein. It should be noted that LMU 202 may capture 3D and/or 2D image data/datasets of a variety of loading facilities or other areas, such that additional loading facilities or areas (e.g., warehouses, etc.) in addition to the predefined search spaces (e.g., load point 101) are contemplated herein.

In some embodiments, for example, LMU 202 may process the 3D and 2D image data/datasets, as scanned or sensed from the 3D camera and photo-realistic camera, for use by other devices (e.g., an external server). For example, the processing board 258 of LMU 202 may process the image data or datasets captured, scanned, or sensed from load point 101. The processing of the image data may generate post-scanning data that may include metadata, simplified data, normalized data, result data, status data, or alert data as determined from the original scanned or sensed image data. In some embodiments, the image data and/or the post-scanning data may be sent to a client device/client application, such as a container feature assessment app that may be, for example, installed and executing on a client device, for viewing, manipulation, or otherwise interaction. In other embodiments, the image data and/or the post-scanning data may be sent to a server for storage or for further manipulation. For example, the image data and/or the post-scanning data may be sent to a server. In such embodiments, the server or servers may generate post-scanning data that may include metadata, simplified data, normalized data, result data, status data, or alert data as determined from the original scanned or sensed image data provided by LMU 202. As described herein, the server or other centralized processing unit and/or storage may store such data, and may also send the image data and/or the post-scanning data to a dashboard app, or other app, implemented on a client device, such as the container feature assessment app implemented on a client device.

Figure 3:
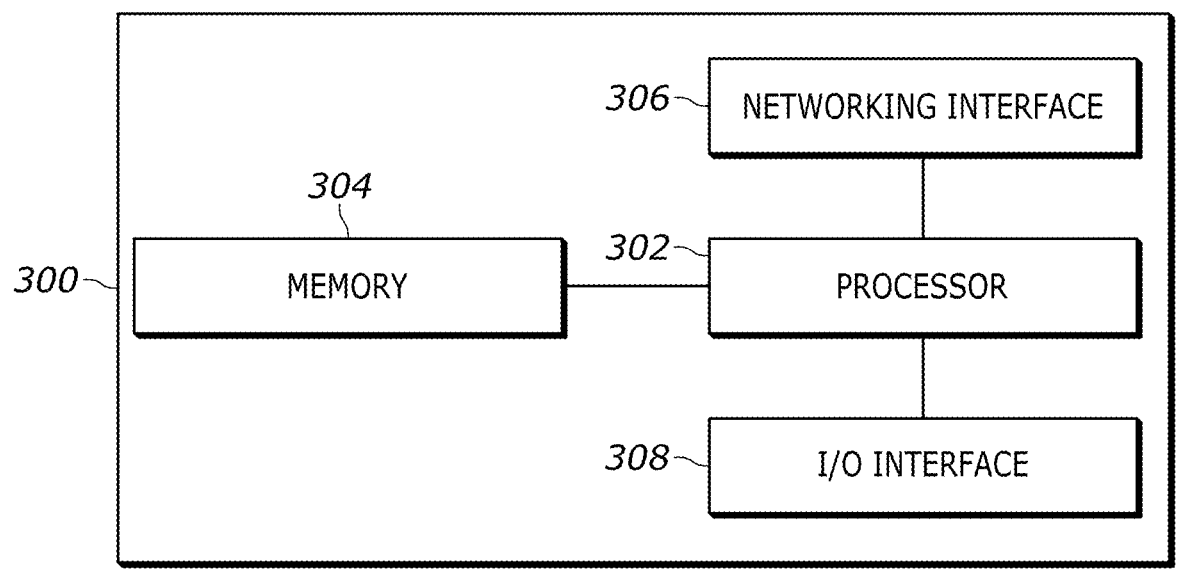
FIG. 3 is a block diagram of an example logic circuit for implementing example methods and/or operations described herein.

FIG. 3 is a block diagram representative of an example logic circuit capable of implementing, for example, one or more components of the example TMU of FIG. 2 or, more specifically, the example processing board 258 of FIG. 2. The example logic circuit of FIG. 3 is a processing platform 300 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 300 of FIG. 3 includes a processor 302 such as, for example, one or more microprocessors, controllers, and/or any suitable type of processor. The example processing platform 300 of FIG. 3 includes memory (e.g., volatile memory, non-volatile memory) 304 accessible by the processor 302 (e.g., via a memory controller). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 300 to provide access to the machine-readable instructions stored thereon.

The example processing platform 300 of FIG. 3 also includes a network interface 306 to enable communication with other machines via, for example, one or more networks. The example network interface 306 includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example, processing platform 300 of FIG. 3 also includes input/output (I/O) interfaces 308 to enable receipt of user input and communication of output data to the user. Such user input and communication may include, for example, any number of keyboards, mice, USB drives, optical drives, screens, touchscreens, etc.

Figure 4:
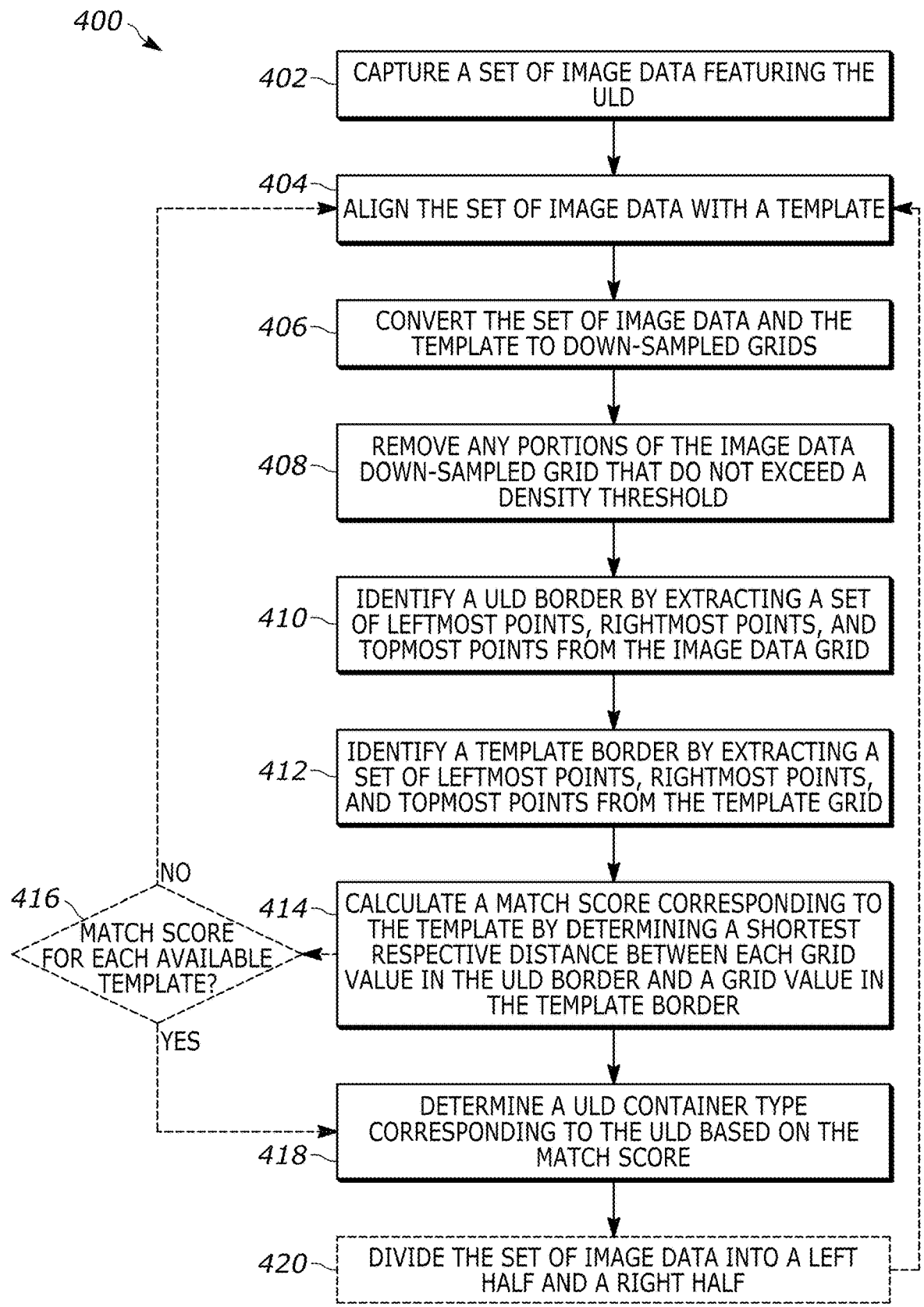
FIG. 4 is a flowchart representative of a method for determining a ULD container type, in accordance with embodiments described herein.

FIG. 4 is a flowchart representative of a method 400 for determining a ULD container type, in accordance with embodiments described herein. Method 400 describes various methods for determining a ULD container type, and embodiments of the method 400 are discussed below in context with FIGS. 5 and 6. Generally speaking, the method 400 for determining a ULD container type captures an image of the ULD within a load point (e.g., load point 101), fits one or more templates to the front border of the ULD, and determines a ULD container type based on which template has the best fit to the front border. The templates used to match the front border of the ULD may be predetermined and stored in memory (e.g., memory 304), and/or retrieved from a remote source (e.g., via networking interface 306). The LMU may be able to manipulate the templates to facilitate the matching process. For example, if a template for a particular ULD type is inappropriately scaled when compared with an image captured by the LMU, the LMU may scale the template to match the scale of the image. Of course, it is to be appreciated that the LMU may perform any other suitable manipulation of the templates or images in order to facilitate the actions described herein with respect to the method 400.

The method 400 begins by capturing a set of image data featuring the ULD (block 402). Broadly, the set of image data may represent the load point, such that the set of image data may feature the ULD when the ULD is located within the load point (e.g., during a loading session). The LMU 202 of FIG. 2 may automatically capture or receive a signal from an operator instructing the LMU 202 to capture a set of image data in response to the presence of a ULD in the load point (e.g., load point 101). For example, the set of image data may appear similar to the any of the first image 110, the second image 116, and/or other suitable images of ULDs. The LMU 202 may capture image data of the ULD using any number of cameras included in the LMU 202, such as the ToF camera 254 and/or the photo-realistic camera 256. Block 402 may be performed by, for example, the ToF camera 254 of FIG. 2.

In embodiments, the set of image data featuring the ULD comprises (i) a three-dimensional depth image and (ii) a red-green-blue (RGB) image. As mentioned, the imaging systems of the LMU may include multiple cameras, such as the ToF camera 254 and the photo-realistic camera 256. These cameras 254, 256 may be configured to capture image data simultaneously, but the two sets of image data may be from two different perspectives due to the physical displacement between the cameras 254, 256. Accordingly, in these embodiments, the LMU may align the image data captured by the photo-realistic camera 256 (RGB image) with the image data captured by the ToF camera 254.

The method 400 continues by aligning the set of image data with a template (block 404). Generally, the template may be an image representing a known ULD container type. More specifically, the template may represent the front face (e.g., front door and opening of the ULD) of the ULD, but it should be appreciated that the template may include any suitable portion of the ULD. The template may be a three-dimensional depth image, an RGB image, or any other suitable image type. For example, the template may be a 3-D depth image of an AMJ type ULD.

To align the set of image data with the template, the LMU may generally locate the edges of the ULDs featured in both images and scale the template to match the set of image data. The LMU may utilize an edge detection algorithm or other suitable edge location method to locate the edges of the featured ULDs in both images. Block 404 may be performed by, for example, the processor 302.

The method 400 may continue by converting the set of image data and the template to down-sampled grids (block 406). Down-sampling the set of image data and the template broadly includes converting multiple data points into fewer data points or a single data point. The LMU may begin by overlaying the set of image data and the template with a grid including a plurality of rows and columns, which themselves define a plurality of cells. In this manner, the LMU may convert the set of image data to a first down-sampled grid and the template to a second down-sampled grid. The LMU may then determine grid values for the first and second down-sampled grids by binning (or counting) the number of data points included in each cell of the first and second down-sampled grid to determine whether the number of data points exceeds a down-sampling threshold. If the LMU determines that the number of points in a particular cell exceeds the down-sampling threshold, the LMU may indicate that the particular cell includes data with a corresponding grid value (e.g., fill the cell). However, if the LMU determines that the number of points in a particular cell does not exceed the down-sampling threshold, the LMU may indicate that the particular cell does not include data with a corresponding grid value(e.g., leave the cell empty). Block 406 may be performed by, for example, the processor 302.

In embodiments, each row in the plurality of rows is separated from adjacent rows in the plurality of rows by a predetermined row distance, and each column in the plurality of columns is separated from adjacent columns in the plurality of columns by a predetermined column distance. For example, each row may be separated from adjacent rows by 1 mm, and each column may be separated from adjacent columns by 1 mm. Thus, the first and second down-sampled grids may include cells that are 1 mm×1 mm in dimension. Of course, the predetermined row distance and the predetermined column distance may be any suitable values, and may be different for different ULD container types. For example, full scale ULD container types may have larger predetermined row and column distances than half scale ULD container types to account for the larger amount of data likely to be present from a full scale ULD.

Moreover, in embodiments where the set of image data and/or the template are 3-D depth images or other images including depth values, the LMU may down-sample the set of image data and the template by ignoring the depth values of each data point included therein. For example, each data point (e.g., pixel) in the set of image data and the template may include coordinate values to represent their respective positions within the images. A pixel in the set of image data may have a coordinate value of the type (x, y, z), where x is horizontal position, y is lateral position, and z is depth. Pixels with large x values may be displaced further to the left or right of the center of the camera FOV or further from the left or right side of the camera FOV than pixels with smaller x values. Pixels with large y values may be further above or below the center of the camera FOV or further from the top or bottom of the camera FOV than pixels with smaller y values. Pixels with large z values may be further away from the camera than pixels with smaller y values. The LMU may down-sample the set of image data and the template by ignoring the z values and only considering the x and y values. Each data point included in the set of image data and the template may be presumed to be a portion of the front face of the ULD represented in the respective images, and as a result, many of the data points may have similar z values. Thus, the z values may not be a useful metric for sorting, so the LMU may ignore the z values to save processing time and resources.

The method 400 continues by removing any portions of the first down-sampled grid that do not exceed a density threshold (block 408). Occasionally, the set of image data may include extraneous data points that do not correspond to the ULD, or at least not the ULD front face. Typically though, these extraneous data points are received by the ToF camera in sparse clusters with significantly lower density than the data points representing the ULD front face border. Accordingly, to achieve a high-fidelity representation of the front face border of a ULD, the LMU may exclude these extraneous data points by filtering out low-density data point clusters. The density threshold may be a number of received data points per number of pixels, a number of grid values per number of cells, and/or any other suitable representation. Block 408 may be performed by, for example, the processor 302.

Figure 5:
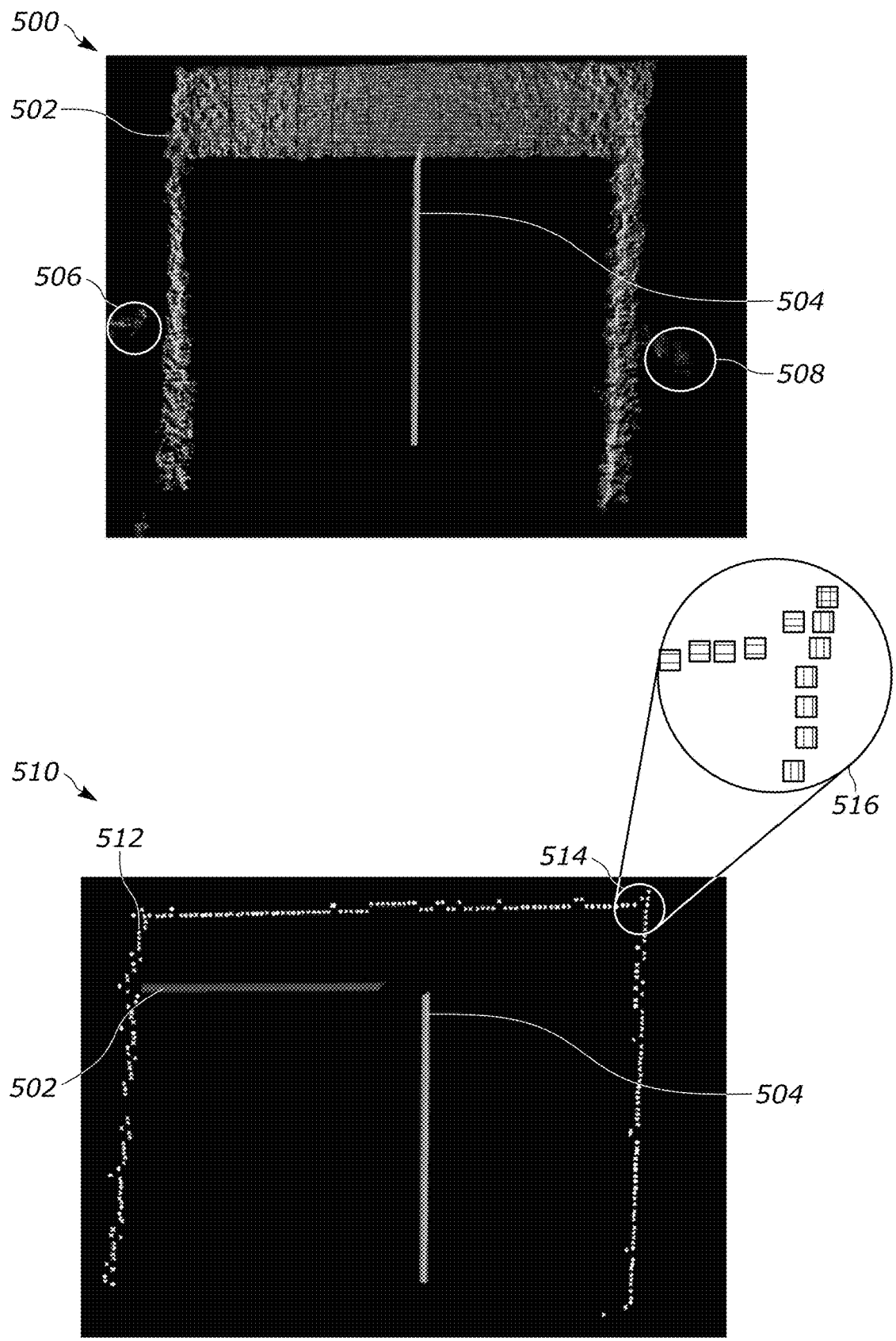
FIG. 5 illustrates a 3-D image of a ULD front face and a down-sampled grid of the ULD front face used to facilitate example methods and/or operations described herein.

For example, and in reference to FIG. 5, the LMU may capture a set of image data featuring a ULD. The LMU may process the set of image data when aligning it with the template, to generate a ULD front face image 500 including a horizontal axis 502 and a vertical axis 504. The horizontal and vertical axes 502, 504 may represent the x and y axes referenced above that the LMU may use when identifying pixels within the image. The ULD front face image 500 may also include a first extraneous pixel cluster 506 and a second extraneous pixel cluster 508, which may represent reflections from surfaces within the loading point, or other sources that are distinct from the front surface of the ULD.

After converting the ULD front face image 500 to a down-sampled grid (e.g., first down-sampled grid), the first extraneous pixel cluster 506 and the second extraneous pixel cluster 508 may remain in the down-sampled grid despite being unassociated with the ULD front face. To prevent the extraneous pixels clusters 506, 508 from influencing the ULD border determination, the LMU may scan the entire down-sampled grid to calculate grid value densities for each grid value and/or set or subset of grid values, and may identify the grid values representing the first extraneous pixel cluster 506 and the second extraneous pixel cluster 508 as being relatively low-density grid values. The LMU may compare the grid value densities associated with the first and second extraneous pixel clusters 506, 508 to a density threshold and determine that both grid value densities do not exceed the density threshold. Accordingly, the LMU may remove the grid values representing the first extraneous pixel cluster 506 and the second extraneous pixel cluster 508 from the down-sampled grid.

Similar to the set of image data, the templates may occasionally include extraneous data points that do not correspond to the ULD, or at least not the ULD front face. Accordingly, the LMU may additionally or alternatively remove portions of the second down-sampled grid that do not exceed a density threshold, consistent with the removal techniques described herein.

In embodiments, the LMU may remove portions of the first down-sampled grid that do not exceed a density threshold by applying a depth-first search (DFS) algorithm. The DFS algorithm may be stored in memory (e.g., memory 304), retrieved from an external source (e.g., via networking interface 306), and/or otherwise accessed by the LMU to remove portions of the first down-sampled grid that do not exceed the density threshold.

The method 400 continues by identifying a ULD border (block 410). Generally, the ULD border may be an outline or other representation of the ULD front face comprised of cells extracted from the first down-sampled grid. The plurality of cells included in the first down-sampled grid may include respective grid values indicating that the density of data points included in the ULD front face image 500 either exceeded or did not exceed the density threshold. To generate the ULD border, the LMU may scan the first down-sampled grid to extract grid values representing data point densities that exceeded the density threshold. Block 410 may be performed by, for example, the processor 302.

More specifically, the LMU may extract a leftmost grid value and a rightmost grid value from each row of the plurality of rows defining the first down-sampled grid. To complete the ULD border, the LMU may further extract a first topmost grid value from each column of the plurality of columns defining the first down-sampled grid. In reference to FIG. 5, the ULD border may appear similar to the ULD border image 510, which includes a ULD border 512 and the horizontal axis 502 and the vertical axis 504 described herein. Each of the cell values included in the ULD border 512 may represent a leftmost, rightmost, or topmost cell value in a particular row/column of the first down-sampled grid.

For example, the cell cluster 514 may be associated with the top-right corner of the ULD front face (from the perspective of the LMU). The cell cluster 514 is comprised of a plurality of cells, as shown in the expanded view 516 of the cell cluster 514. Each cell of the cell cluster 514 that represents the ULD front face top horizontal border (e.g., cells with a horizontal patterning in the expanded view 516) may represent a topmost value of a particular column of the first down-sampled grid. Each cell of the cell cluster 514 that is included in the ULD front face right vertical border (e.g., cells with a vertical patterning in the expanded view 516) may represent a rightmost value of a particular row of the first down-sampled grid. The cell of the cell cluster 514 that represents the intersection of the ULD front face top horizontal border with the ULD front face right vertical border (e.g., the cell with a grid cross hatching in the expanded view 516) may represent both a topmost and a rightmost value of a particular column/row of the first down-sampled grid.

The method 400 may continue by identifying a template border (block 412). Generally, identifying the template border may proceed similarly to the identification of the ULD border. The LMU may analyze the rows/columns of the second down-sampled grid to identify and extract the cells defining the template border. More specifically, the LMU may extract a leftmost grid value and a rightmost grid value from each row of the plurality of rows defining the second down-sampled grid. To complete the template border, the LMU may further extract a first topmost grid value from each column of the plurality of columns defining the second down-sampled grid. Block 412 may be performed by, for example, the processor 302.

The method 400 may continue by calculating a match score corresponding to the template by determining a shortest respective distance between each grid value in the ULD border and a respective grid value in the template border (block 414). As previously mentioned, by aligning the set of image data and the template, the cells included in the first down-sampled grid and the second down-sampled grid may correspond to the same image dimensions (e.g., pixel dimensions within the respective image) and physical dimensions (e.g., corresponding dimensions in 3-D space). Accordingly, distances measured between cells in the first down-sampled grid and the second down-sampled grid may accurately correspond to physical distances between the ULD border and the border of the ULD type represented by the template. Block 414 may be performed by, for example, the processor 302.

Generally, the LMU may calculate the match score by determining the shortest respective distance between each grid value in the ULD border and a respective grid value in the template. The LMU may then sum each of the distances corresponding to each ULD border grid value to calculate the match score. As a result, as the match score increases, the less likely it is that the ULD represented by the template accurately represents the ULD represented by the ULD border. Thus, templates with a relatively small shortest respective distance between each grid value and a respective grid value in the ULD border may receive a relatively small match score (e.g., a strong match score), and templates with a relatively large shortest respective distance between each grid value and a respective grid value in the ULD border may receive a relatively large match score (e.g., a weak match score).

It is to be appreciated that the match score may be calculated in any suitable manner, and may represent a match between a ULD border and a template in any suitable fashion (e.g., higher match score represent a higher likelihood of a match, etc.). Moreover, it is to be appreciated that the match score may be calculated in units defined by the cell values of the down-sampled grids (e.g., x and y values discussed herein), dimensions corresponding to the 3-D scale of the ULD (e.g., feet, inches, meters, etc.), and/or any other suitable units.

Figure 6:
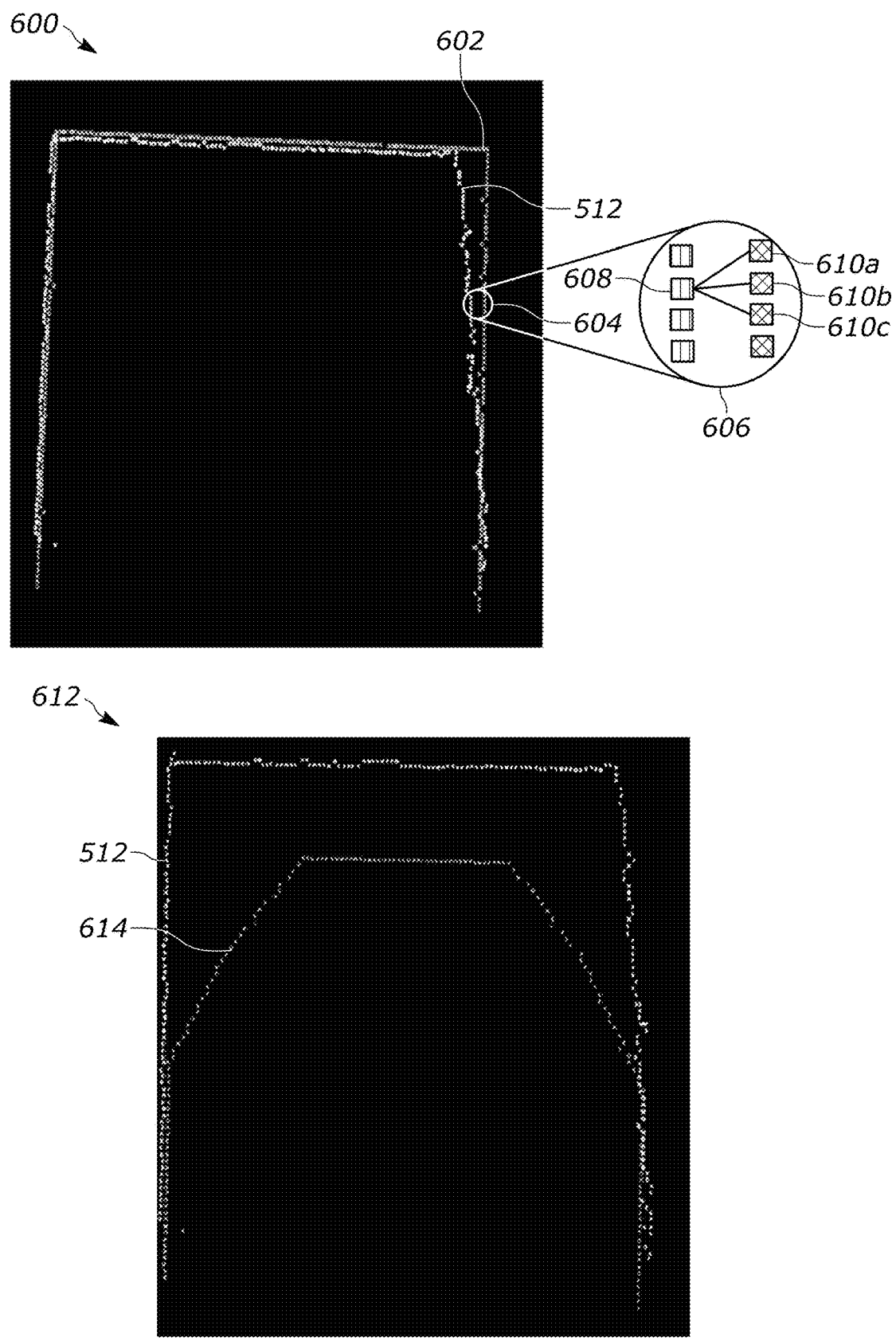
FIG. 6 illustrates two template overlays of the down-sampled grid of FIG. 5 used to facilitate example methods and/or operations described herein.

In reference to the template match image 600 of FIG. 6, the LMU may overlay a first template 602 onto the ULD border 512. The LMU may then choose one cell of the ULD border 512 and calculate the shortest respective distance between that one cell and corresponding cells in the first template 602. Once the LMU determines the shortest respective distance between the one cell in the ULD border 512 and a corresponding cell in the template 602, the LMU may select a new cell in the ULD border 512 and determine the shortest respective distance between the new cell and a corresponding cell in the template 602. The LMU may continue determining the shortest respective distance between cells in the ULD border 512 and cells in the template 602 until the LMU has determined a shortest respective distance between each ULD border 512 cell and a corresponding cell in the template 602.

For example, assume that the LMU reaches the cell region 604 within the ULD border 512, and as shown in the expanded view 606, chooses to calculate the shortest respective distance between a first cell 608 and a number of adjacent cells within the first template 602. The LMU may identify adjacent cells in the first template 602 based upon their designation as template cells (illustrated as a diamond cross-hatching), as opposed to the cells from the ULD border 512 that may be designated as ULD border cells (illustrated as a vertical patterning). The cell designation may be assigned to the ULD border 512 cells and the template (e.g., first template 602) cells when they are extracted from the first and second down-sampled grids, respectively, and may be stored in memory (e.g., memory 304). Accordingly, the LMU may identify adjacent cells 610a, 610b, 610c based upon their designations as first template 602 cells, and may calculate the distance from each adjacent cell 610a, 610b, 610c to the first cell 608 based upon their respective coordinate positions (e.g., the x and y values described herein). In this example, the LMU may determine that the adjacent cell 610b is closest to the first cell 608. The LMU may then continue to determine the shortest respective distance between a ULD border 512 cell and any cell in the first template 602 until the LMU has determined the shortest respective distance between each ULD border 512 cell and a corresponding first template 602 cell.

Continuing this example, the LMU may sum all of the distances between the ULD border 512 cells and the corresponding cells of the first template 602 to determine a match score. The distances between the ULD border 512 cells and the corresponding cells of the first template 602 may be relatively small on average, and as a result, the first template 602 may correspond to a low match score. Accordingly, the LMU may determine that the ULD associated with the first template 602 is likely to correspond to the ULD represented by the ULD border 512. For example, the ULD border 512 may represent an AMJ type ULD front face, and the first template 602 may represent a standard or known AMJ type ULD front face.

The LMU may determine match scores in this manner for any template available to the LMU (e.g., via memory 304, accessible via the networking interface 306, and/or accessed through any other suitable means), and may thus iteratively determine match scores for templates until the LMU identifies a template that matches the ULD represented in the set of image data. However, the LMU may not always match the correct ULD template with the set of image data during the initial iteration of the template matching process. Occasionally, the LMU may compare the ULD border (e.g., ULD border 512) with a mismatched template. Thus, the method 400 may optionally continue by determining whether a match score for each available template has been calculated (optional block 416). Optional block 416 may be performed by, for example, the processor 302.

For example, the template mismatch image 612 illustrates such a scenario when the LMU selects a second template 614 that does not represent the ULD type corresponding to the ULD border 512. The LMU may determine the shortest respective distance between each ULD border 512 cell and a corresponding cell in the second template 614, and calculate the match score by summing all of the shortest respective distances. In this scenario, the distances between the ULD border 512 cells and the corresponding cells of the second template 614 may be relatively large on average, and as a result, the second template 614 may correspond to a high match score. Accordingly, the LMU may determine that the ULD associated with the second template 614 is unlikely to correspond to the ULD represented by the ULD border 512. For example, the ULD border 512 may represent an AMJ type ULD front face, and the second template 614 may represent a standard or known SAA type ULD front face.

Further in this scenario, and in embodiments, the LMU may additionally or alternatively use the location of cells in the second template 614 to which the cells in the ULD border 512 are closest to determine the match score. Generally, the LMU may identify or otherwise label cells corresponding to the side of the ULD of which they are a part (e.g., left, right, top, bottom, etc.). Because the second template 614 varies significantly at the top portions from the ULD border 512, cells near the top corners of the ULD border 512 may be closest to a cell on a different side of the second template 614. For example, the LMU may determine that the cells near the top-left corner of the ULD border 512 are closest to cells on the side of the second template 614. The LMU may calculate these shortest distances, recognize the disparity between the cell location types (e.g., top ULD border 512 cell closest to a second template 614 side cell), and modify the match score accordingly. The LMU may increase the match score for each mismatched cell type identified, apply a scaling factor, or otherwise adjust the match score to compensate for the cell type mismatch.

If the LMU determines that a match score has been calculated for each available template (YES branch of optional block 416), the method 400 may continue to block 418. However, if the LMU determines that a match score has not been calculated for each available template (NO branch of optional block 416), the LMU may select a new template and the method 400 may return to block 404.

In embodiments, the template may be a set of templates, and the template border may be a set of template borders. The LMU may accordingly calculate a respective match score corresponding to each respective template by determining a shortest respective distance between each grid value in the ULD border and a respective grid value in a respective template border. The LMU may then determine a closest respective match score by comparing each respective match score to every other respective match score. For example, if the first template 602 receives a match score of 95 units (total distance between all ULD border 512 cells and their respective closest cells within the first template 602) and the second template 614 receives a match score of 250 units, the LMU may determine that the first template 602 has the closest respective match score.

In embodiments, the LMU may determine the match score by applying a k-dimensional (k-d) tree search algorithm. More specifically, the LMU may calculate the shortest respective distance between each grid value in the ULD border and a respective grid value in the template border using a k-d tree search algorithm.

The method 400 continues by determining a ULD container type corresponding to the ULD represented in the set of image data based on the match score (block 418). Generally speaking, the LMU may compare any match scores determined as a result of comparing one or more templates to the set of image data and identify the lowest match score as the template that corresponds to the correct ULD container type. Block 418 may be performed by, for example, the processor 302.

For example, assume that the LMU compares a set of image data to three templates. Further assume that the first template receives a match score of 100 units, the second template receives a match score of 200 units, and the third template receives a match score of 300 units. The LMU may determine that the first template corresponds to the ULD represented in the set of image data, and thus may associate the ULD container type associated with the first template with the ULD represented in the set of image data.

In embodiments, the LMU may additionally or alternatively utilize a match score threshold, which may establish a match score value, above which, the LMU may not determine a match between the template and the ULD represented in the set of image data. The LMU may retrieve from memory (e.g., memory 304), request from an external source (e.g., via networking interface 306), and/or otherwise access the match score threshold. Accordingly, in these embodiments, the LMU may fail to determine a ULD container type corresponding to the ULD if the calculated match scores exceed the match score threshold. The LMU may additionally generate and/or transmit an alert signal to a backend server or a user interface to alert a user/operator to the failed ULD container type determination.

In reference to the above example, assume the LMU additionally retrieves a match score threshold of 50 units. In this embodiment, the LMU may not associate the ULD container type associated with the first, second, or third template with the ULD represented in the set of image data because each of their respective match scores exceeded the match score threshold. The LMU may then generate and transmit an alert signal to a user interface to inform the user/operator that the ULD container type was not determined, and/or what ULD container types were identified as not matching the ULD represented in the set of image data.

Occasionally, the set of image data may represent one or two half scale ULDs instead of a single full scale ULD (e.g., second image 116). To accommodate this scenario, the LMU may perform the method 400 to determine match scores corresponding to half scale ULDs for each set of image data. Thus, the method 400 may optionally continue by dividing the first down-sampled grid into a left half and a right half, creating two down-sampled grids from the first down-sampled grid. The method 400 may then return to block 404, where the LMU performs the remaining actions associated with the method 400 with respect to both of the two down-sampled grids created by halving the first down-sampled grid.

More specifically, the LMU may identify a first ULD border by extracting (i) a left half leftmost grid value and a left half rightmost grid value for each row of the plurality of rows and (ii) a left half topmost grid value for each column of the plurality of columns in the left half, and identify a second ULD border by extracting (i) a right half leftmost grid value and a right half rightmost grid value for each row of the plurality of rows and (ii) a right half topmost grid value for each column of the plurality of columns in the right half. The LMU may then proceed to calculate a match score corresponding to each side of the set of image data. Specifically, the LMU may calculate (i) a left match score corresponding to the template by determining a shortest respective distance between each left half grid value in the first ULD border and a respective grid value in the template border and (ii) a right match score corresponding to the template by determining a shortest respective distance between each right half grid value in the second ULD border and a respective grid value in the template border.

The LMU may then determine a ULD container type by comparing the match scores corresponding to the left half and the right half to the match score corresponding to the full scale ULD templates. The LMU may add the match scores of the left half and the right half to determine the aggregate distance of the first and second ULD borders from the templates, and compare the added total of the left half and right half match scores to the match score of each full scale ULD template.

For example, assume the set of image data corresponds to a pair of AKE half-scale ULDs (e.g., the second image 116). The LMU may calculate match scores for the set of image data based on full scale ULD templates, and then proceed to divide the set of image data and calculate match scores for each respective half of the image data. Assume that the best match score based on a first full scale ULD template is 103 units, and that the best match score for the left half based on a first half scale ULD template is 35 units and the best match score for the right half based on a second half scale ULD template is 43 units. The LMU may add the right and left half match scores together to determine an aggregate half scale ULD match score of 78 units, compare the aggregate half scale ULD match score to the first full scale ULD template match score, and determine that the aggregate half scale ULD match score is the best match score. Accordingly, the LMU may associate the ULD container types associated with the first half scale ULD template and the second half scale ULD template with the ULD represented in the left half and the right half of the set of image data, respectively.

It is to be understood that the LUM may perform the actions described with respect to optional block 420 after each performance of the actions associated with the method 400. The LMU may divide the first down-sampled grid into left and right halves and return to block 404 to perform the remaining actions associated with the method 400 with respect to both of the two down-sampled grids created by halving the first down-sampled grid after each iteration of the method 400.

Additionally, it is to be understood that each of the actions described in the method 400 may be performed in any order, number of times, or any other combination(s) therein suitable to determine the ULD container type. For example, some or all of the blocks of the method 400 may be fully performed first for the set of image data and then for the template, or vice versa.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for determining a unit load device (ULD) container type, comprising:
   capturing a set of image data featuring the ULD;
   aligning the set of image data with a template;
   converting (i) the set of image data to a first down-sampled grid including a plurality of rows and a plurality of columns and (ii) the template to a second down-sampled grid including the plurality of rows and the plurality of columns;
   removing any portions of the first down-sampled grid that do not exceed a density threshold;
   identifying a ULD border by extracting (i) a first leftmost grid value and a first rightmost grid value from each row of the plurality of rows and (ii) a first topmost grid value from each column of the plurality of columns;
   identifying a template border by extracting (i) a second leftmost grid value and a second rightmost grid value from each row of the plurality of rows and (ii) a second topmost grid value from each column of the plurality of columns;
   calculating a match score corresponding to the template by determining a shortest respective distance between each grid value in the ULD border and a respective grid value in the template border; and
   determining a ULD container type corresponding to the ULD based on the match score.

2. The method of claim 1, wherein the template is a set of templates, the template border is a set of template borders, and the method further comprises:
   calculating a respective match score corresponding to each respective template by determining a shortest respective distance between each grid value in the ULD border and a respective grid value in a respective template border;
   determining a closest respective match score by comparing each respective match score to every other respective match score; and
   determining the ULD container type by associating the ULD with the respective template associated with the closest respective match score.

3. The method of claim 1, further comprising:
   dividing the first down-sampled grid into a left half and a right half;
   identifying a first ULD border by extracting (i) a left half leftmost grid value and a left half rightmost grid value for each row of the plurality of rows and (ii) a left half topmost grid value for each column of the plurality of columns in the left half;
   identifying a second ULD border by extracting (i) a right half leftmost grid value and a right half rightmost grid value for each row of the plurality of rows and (ii) a right half topmost grid value for each column of the plurality of columns in the right half;
   calculating (i) a left match score corresponding to the template by determining a shortest respective distance between each left half grid value in the first ULD border and a respective grid value in the template border and (ii) a right match score corresponding to the template by determining a shortest respective distance between each right half grid value in the second ULD border and a respective grid value in the template border; and
   determining a ULD container type corresponding to the ULD based on the sum of the left match score and the right match score.

4. The method of claim 1, further comprising:
   overlaying a grid on the set of image data and the template, the grid including a plurality of cells defined by the plurality of rows and the plurality of columns, wherein each row in the plurality of rows is separated from adjacent rows in the plurality of rows by a predetermined row distance, and wherein each column in the plurality of columns is separated from adjacent columns in the plurality of columns by a predetermined column distance; and
   determining a plurality of grid values by binning respective data from the set of image data that is included in each respective cell of the plurality of cells and comparing the respective data to a down-sampling threshold.

5. The method of claim 1, further comprising:
   determining the shortest respective distance between each grid value in the ULD border and a respective grid value in the template border using a k-dimensional (k-d) tree search algorithm.

6. The method of claim 1, further comprising:
   removing the portions of the first down-sampled grid that do not exceed a density threshold by applying a depth-first search (DFS) algorithm.

7. A system for determining a unit load device (ULD) container type, comprising:
   a housing;
   an imaging assembly at least partially within the housing and configured to capture a set of image data featuring the ULD;
   one or more processors; and
   a non-transitory computer-readable memory coupled to the imaging assembly and the one or more processors, the memory storing instructions thereon that, when executed by the one or more processors, cause the one or more processors to:
   align the set of image data with a template,
   convert (i) the set of image data to a first down-sampled grid including a plurality of rows and a plurality of columns and (ii) the template to a second down-sampled grid including the plurality of rows and the plurality of columns,
   remove any portions of the first down-sampled grid that do not exceed a density threshold,
   identify a ULD border by extracting (i) a first leftmost grid value and a first rightmost grid value from each row of the plurality of rows and (ii) a first topmost grid value from each column of the plurality of columns,
   identify a template border by extracting (i) a second leftmost grid value and a second rightmost grid value from each row of the plurality of rows and (ii) a second topmost grid value from each column of the plurality of columns, calculate a match score corresponding to the template by determining a shortest respective distance between each grid value in the ULD border and a respective grid value in the template border, and determine a ULD container type corresponding to the ULD based on the match score.

8. The system of claim 7, wherein the template is a set of templates, the template border is a set of template borders, and the instructions, when executed, further cause the one or more processors to:

calculate a respective match score corresponding to each respective template by determining a shortest respective distance between each grid value in the ULD border and a respective grid value in a respective template border;

determine a closest respective match score by comparing each respective match score to every other respective match score; and determine the ULD container type by associating the ULD with the respective template associated with the closest respective match score.

9. The system of claim 7, wherein the instructions, when executed, further cause the one or more processors to:

divide the first down-sampled grid into a left half and a right half;

identify a first ULD border by extracting (i) a left half leftmost grid value and a left half rightmost grid value for each row of the plurality of rows and (ii) a left half topmost grid value for each column of the plurality of columns in the left half;

identify a second ULD border by extracting (i) a right half leftmost grid value and a right half rightmost grid value for each row of the plurality of rows and (ii) a right half topmost grid value for each column of the plurality of columns in the right half;

calculate (i) a left match score corresponding to the template by determining a shortest respective distance between each left half grid value in the first ULD border and a respective grid value in the template border and (ii) a right match score corresponding to the template by determining a shortest respective distance between each right half grid value in the second ULD border and a respective grid value in the template border; and determine a ULD container type corresponding to the ULD based on the sum of the left match score and the right match score.

10. The system of claim 7, wherein the instructions, when executed, further cause the one or more processors to:

overlay a grid on the set of image data and the template, the grid including a plurality of cells defined by the plurality of rows and the plurality of columns, wherein each row in the plurality of rows is separated from adjacent rows in the plurality of rows by a predetermined row distance, and wherein each column in the plurality of columns is separated from adjacent columns in the plurality of columns by a predetermined column distance; and determine a plurality of grid values by binning respective data from the set of image data that is included in each respective cell of the plurality of cells and comparing the respective data to a down-sampling threshold.

11. The system of claim 7, wherein the instructions, when executed, further cause the one or more processors to:

determine the shortest respective distance between each grid value in the ULD border and a respective grid value in the template border using a k-dimensional (k-d) tree search algorithm.

12. The system of claim 7, wherein the instructions, when executed, further cause the one or more processors to:

remove the portions of the first down-sampled grid that do not exceed a density threshold by applying a depth-first search (DFS) algorithm.

13. A tangible machine-readable medium comprising instructions for determining a unit load device (ULD) container type that, when executed, cause a machine to at least:

capture a set of image data featuring the ULD;

align the set of image data with a template, convert (i) the set of image data to a first down-sampled grid including a plurality of rows and a plurality of columns and (ii) the template to a second down-sampled grid including the plurality of rows and the plurality of columns, remove any portions of the first down-sampled grid that do not exceed a density threshold, identify a ULD border by extracting (i) a first leftmost grid value and a first rightmost grid value from each row of the plurality of rows and (ii) a first topmost grid value from each column of the plurality of columns, identify a template border by extracting (i) a second leftmost grid value and a second rightmost grid value from each row of the plurality of rows and (ii) a second topmost grid value from each column of the plurality of columns, calculate a match score corresponding to the template by determining a shortest respective distance between each grid value in the ULD border and a respective grid value in the template border, and determine a ULD container type corresponding to the ULD based on the match score.

14. The tangible machine-readable medium of claim 13, wherein the template is a set of templates, the template border is a set of template borders, and wherein the instructions, when executed, further cause the machine to at least:

calculate a respective match score corresponding to each respective template by determining a shortest respective distance between each grid value in the ULD border and a respective grid value in a respective template border;

determine a closest respective match score by comparing each respective match score to every other respective match score; and determine the ULD container type by associating the ULD with the respective template associated with the closest respective match score.

15. The tangible machine-readable medium of claim 13, wherein the instructions, when executed, further cause the machine to at least:

divide the first down-sampled grid into a left half and a right half;

identify a first ULD border by extracting (i) a left half leftmost grid value and a left half rightmost grid value for each row of the plurality of rows and (ii) a left half topmost grid value for each column of the plurality of columns in the left half;

identify a second ULD border by extracting (i) a right half leftmost grid value and a right half rightmost grid value for each row of the plurality of rows and (ii) a right half topmost grid value for each column of the plurality of columns in the right half;

calculate (i) a left match score corresponding to the template by determining a shortest respective distance between each left half grid value in the first ULD border and a respective grid value in the template border and (ii) a right match score corresponding to the template by determining a shortest respective distance between each right half grid value in the second ULD border and a respective grid value in the template border; and determine a ULD container type corresponding to the ULD based on the sum of the left match score and the right match score.

16. The tangible machine-readable medium of claim 13, wherein the instructions, when executed, further cause the machine to at least:

overlay a grid on the set of image data and the template, the grid including a plurality of cells defined by the plurality of rows and the plurality of columns, wherein each row in the plurality of rows is separated from adjacent rows in the plurality of rows by a predetermined row distance, and wherein each column in the plurality of columns is separated from adjacent columns in the plurality of columns by a predetermined column distance; and determine a plurality of grid values by binning respective data from the set of image data that is included in each respective cell of the plurality of cells and comparing the respective data to a down-sampling threshold.

17. The tangible machine-readable medium of claim 13, wherein the instructions, when executed, further cause the machine to at least:

determine the shortest respective distance between each grid value in the ULD border and a respective grid value in the template border using a k-dimensional (k-d) tree search algorithm.

18. The tangible machine-readable medium of claim 13, wherein the instructions, when executed, further cause the machine to at least:

remove the portions of the first down-sampled grid that do not exceed a density threshold by applying a depth-first search (DFS) algorithm.

\* \* \* \* \*